(12) United States Patent
Barancyk et al.

(10) Patent No.: US 8,129,026 B2
(45) Date of Patent: Mar. 6, 2012

(54) (METH)ACRYLATE/ASPARTATE AMINE CURATIVES AND COATINGS AND ARTICLES COMPRISING THE SAME

(75) Inventors: Steve Barancyk, Wexford, PA (US); John Furar, Pittsburgh, PA (US); Howard Senkfor, South Euclid, OH (US); Jonathan T. Martz, Glenshaw, PA (US); Thomas R. Hockswender, Gibsonia, PA (US); Anthony M. Chasser, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/094,298

(22) Filed: Apr. 26, 2011

(65) Prior Publication Data

US 2011/0206935 A1 Aug. 25, 2011

Related U.S. Application Data

(62) Division of application No. 11/611,988, filed on Dec. 18, 2006, now Pat. No. 7,960,495.

(51) Int. Cl.
*B32B 27/40* (2006.01)
(52) U.S. Cl. ............ 428/423.1; 428/687; 525/452; 528/288; 528/310; 528/328
(58) Field of Classification Search .......... 428/423.1, 428/687; 525/452; 528/288, 310, 328
See application file for complete search history.

(56) References Cited

U.S. PATENT DOCUMENTS
2003/0118739 A1* 6/2003 Li et al. ............ 427/421
* cited by examiner

*Primary Examiner* — James J Seidleck
*Assistant Examiner* — Gregory Listvoyb
(74) *Attorney, Agent, or Firm* — Krisanne Shideler

(57) ABSTRACT

(Meth)acrylate/aspartate amine curatives comprising the reaction product of a polyamine, a dialkyl maleate and/or dialkyl fumarate, and a (meth)acrylate are disclosed, as are methods for making the same. A polyurea comprising the reaction product of the acrylate/aspartate amine curative and isocyanate is also disclosed, as are coatings comprising such a polyurea and substrates coated with the same.

18 Claims, No Drawings

(METH)ACRYLATE/ASPARTATE AMINE CURATIVES AND COATINGS AND ARTICLES COMPRISING THE SAME

CROSS-REFERENCE TO RELATED APPLICATION

This patent application is a divisional of U.S. patent application Ser. No. 11/611,988 filed Dec. 18, 2006, entitled: "(METH)ACRYLATE/ASPARTATE AMINE CURATIVES AND COATINGS AND ARTICLES COMPRISING THE SAME".

FIELD OF THE INVENTION

The present invention is directed to a (meth)acrylate/aspartate amine curative comprising the reaction product of a) a polyamine; b) a dialkyl maleate and/or dialkyl fumarate; and c) a (meth)acrylate. The present invention is further directed to a polyurea formed from the reaction of this (meth)acrylate/aspartate amine curative and an isocyanate. The present invention is further directed to substrates coated at least in part with such coatings.

BACKGROUND OF THE INVENTION

Coating compositions comprising polyureas are used in a wide variety of industries such as automotive, watercraft, aircraft, industrial, construction, military, recreational equipment including sports equipment and the like. In these industries, considerable efforts have been made to develop coating compositions that will impart the desired properties to the substrate or article being coated. For example, coatings are used to protect against damage due to corrosion, abrasion, impact, chemicals, ultraviolet light, flame, heat and/or other environmental exposure. In addition to any of these functional properties, coatings can also be used for decorative purposes.

Polyureas are generally formed by reacting amines and isocyanates. The use of amines such as polyamines as crosslinkers or "curatives" is well known. For example, amines are known to crosslink with isocyanates to form urea compounds. Amines are also known to be reactive with, and therefore used with, activated unsaturated groups, epoxy groups, aromatic activated aldehyde groups, cyclic carbonate groups, and acid and anhydride and ester groups. Polyamine crosslinkers with primary amino groups can be quite reactive with some of these functionalities under ambient or low temperature conditions (i.e. less than 100° C.). This high reactivity can result in too short a potlife or other difficulties in application, such as in high pressure impingement spraying. Certain aliphatic secondary amines, however, are not reactive enough with these various functionalities. It is therefore desired to provide amine curatives that are sufficiently reactive, but that provide an adequate potlife. There is a further desire to provide such amine curatives that impart the desired characteristics to the final composition in which they are used.

SUMMARY OF THE INVENTION

The present invention is directed to an (meth)acrylate/aspartate amine curative comprising the reaction product of
a) a polyamine,
b) a dialkyl maleate and/or dialkyl fumarate, and
c) a (meth)acrylate.

The present invention is further directed to a method for preparing an (meth)acrylate/aspartate amine curative comprising reacting
a) a polyamine,
b) a dialkyl maleate and/or dialkyl fumarate, and
c) a (meth)acrylate.

The present invention is also directed to a polyurea comprising the reaction product of a (meth)acrylate/aspartate amine curative and an isocyanate, wherein the (meth)acrylate/aspartate amine curative comprises the reaction product of
a) a polyamine,
b) a dialkyl maleate and/or dialkyl fumarate, and
c) a (meth)acrylate.

DETAILED DESCRIPTION OF THE INVENTION

The present invention is directed to a (meth)acrylate/aspartate amine curative comprising the reaction product of a) a polyamine, b) a dialkyl maleate and/or dialkyl fumarate, and c) a (meth)acrylate. The terms "(meth)acrylate/aspartate amine curative" and "(meth)acrylate aspartate amine" are used interchangeably herein. The term "(meth)acrylate", as will be understood to those skilled in the art, denotes both acrylate and the corresponding methacrylate. In certain embodiments, the curative consists essentially of the reaction product and in certain other embodiments the reaction product consists essentially of one or more polyamines, one or more dialkyl maleates and/or dialkyl fumarates and one or more (meth)acrylates.

Any suitable polyamine can be used according to the present invention. A "polyamine" is an amine with at least 2 primary amino groups. In certain embodiments, the polyamine is a diamine, and the amine nitrogens on the diamine are equally reactive; that is, all of the amine nitrogens are equally likely to react with another functional group. In certain other embodiments, the amine nitrogens of the diamine may be unequal in reactivity toward, for example, (meth)acrylates and/or dialkyl maleates and/or dialkyl fumarates. Examples of suitable diamines include but are not limited to ethylene diamine, 1,2-diaminopropane, 1,5-diamino-2-methylpentane (DYTEK A, Invista), 1,3-diaminopentane (DYTEK EP, Invista), 1,2-diaminocyclohexane (DCH-99, Invista), 1,6-diaminohexane, 1,11-diaminoundecane, 1,12-diaminododecane, 3-(cyclohexylamino)propylamine, 1-amino-3,3,5-trimethyl-5-aminomethylcyclohexane, (isophorone diamine ("IPDA")), 4,4'-diaminodicyclohexylmethane (PACM-20, Air Products; DICYKAN, BASF), 3,3'-dimethyl-4,4'-diaminodicyclohexyl methane (DIMETHYL DICYKAN or LAROMIN C260, BASF; ANCAMINE 2049, Air Products), 3,3'-[1,4-butanediylbis-(oxy)bis]-1-propanamine, menthanediamine, and diamino functional polyetherpolyamines having aliphatically bound primary amino groups, examples of which include JEFFAMINE D-230, JEFFAMINE D-400, JEFFAMINE D-2000, and JEFFAMINE D-4000, Huntsman Corporation. It will be appreciated that when the amine is hindered, the reaction time between the (meth)acrylated amine and the isocyanate will be slower. This gives a longer pot-life or work-processing time in those situations where a longer processing time is desired.

In certain embodiments the polyamine is a triamine. Examples of suitable triamines include but are not limited to diethylene triamine, dipropylene triamine, bis(hexamethylene) triamine and triamino functional polyetherpolyamines having aliphatically bound primary amino groups (JEFFAM- INE T-403, T-3000, T-5000, Huntsman Corporation). In other embodiments the amine can be a tetra amine or other higher functional amine.

Any dialkyl maleate and/or dialkyl fumarate can be used according to the present invention. Examples of suitable dialkyl maleates and fumarates include but are not limited to esters of maleic acid and fumaric acid with monoalcohols such as dimethyl, diethyl, di-n-propyl, di-isopropyl, di-n-butyl, di-sec-butyl, di-tert-butyl, di-isobutyl, di-penyl, di-t-amyl, di-hexyl, cyclohexyl and di-2-ethylhexyl maleates or the corresponding fumarates. In certain embodiments, dialkyl maleates or dialkyl fumarates with two different alkyl groups, and/or mixtures of dialkyl maleates and dialkyl fumarates can be used. The alkyl groups of dialkyl maleate and/or dialkyl fumarate may comprise additional functional groups such as hydroxyl groups, such as the reaction product of maleic anhydride, an alcohol, and an epoxy, the reaction product of maleic acid or fumaric acid with an alcohol and an epoxy, or the reaction product of maleic acid or fumaric acid with an epoxy. Suitable alcohols include but are not limited to methanol, ethanol, propanol, isopropanol, butanol, isobutanol, sec-butanol, tert-butanol, various isomeric pentanols, various isomeric hexanols, cyclohexanol, 2-ethylhexanol, and the like. Suitable epoxies include but are not limited to ethylene oxide, propylene oxide, 1,2-epoxybutane, and glycidyl neodecanoate (an example of which is CARDURA E10P, Hexion Speciality Chemicals, Inc.).

The (meth)acrylate can be any suitable mono or poly (meth)acrylate. In certain embodiments, the polyacrylate comprises di(meth)acrylate, in certain embodiments the polyacrylate comprises tri(meth)acrylate, and in certain embodiments the polyacrylate comprises tetra(meth)acrylate. Suitable monoacrylates include but are not limited to those having the formula:

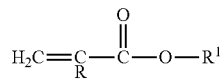

wherein R is H or methyl and $R^1$ may be, without limitation, alkyl or hydroxyalkyl, such as methyl, ethyl, 2-hydroxyethyl, 1-methyl-2-hydroxyethyl, 2-hydroxypropyl, propyl, isopropyl, n-butyl, 2-hydroxybutyl, 4-hydroxybutyl, isobutyl, sec-butyl, tert-butyl, hexyl, 2-ethylhexyl, cyclohexyl, methylcyclohexyl, trimethylcyclohexyl, isobornyl, lauryl, stearyl and the like. Non-limiting examples of mono (meth)acrylates include methyl (meth)acrylate, ethyl (meth)acrylate, propyl (meth)acrylate, butyl (meth)acrylate, isobutyl (meth)acrylate, sec-butyl (meth)acrylate, tert-butyl (meth)acrylate, cyclohexyl (meth)acrylate, 2-ethylhexyl (meth)acrylate, isooctyl (meth)acrylate, isodecyl (meth)acrylate, lauryl (meth)acrylate, stearyl (meth)acrylate, isobornyl (meth)acrylate, hydroxyethyl (meth)acrylate, hydroxypropyl (meth) acrylate, 2-hydroxybutyl (meth)acrylate, 4-hydroxybutyl (meth)acrylate, and adducts of hydroxy (meth)acrylates with lactones such as the adducts of hydroxyethyl (meth)acrylate with ε-caprolactone. Suitable diacrylates include but are not limited to ethylene glycol di(meth)acrylate, 1,3-butylene glycol di(meth)acrylate, 1,4-butanediol di(meth)acrylate, 2,3-dimethylpropane 1,3-di(meth)acrylate, 1,6-hexanediol di(meth)acrylate, propylene glycol di(meth)acrylate, dipropylene glycol di(meth)acrylate, tripropylene glycol di(meth) acrylate, tetraethylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, polybutadiene di(meth)acrylate, thiodiethyleneglycol di(meth)acrylate, trimethylene glycol di(meth) acrylate, triethylene glycol di(meth)acrylate, alkoxylated hexanediol di(meth)acrylate, alkoxyolated neopentyl glycol di(meth)acrylate, pentanediol di(meth)acrylate, cyclohexane dimethanol di(meth)acrylate, ethoxylated bisphenol A di(meth)acrylate, and mixtures thereof. Non-limiting examples of tri and higher (meth)acrylates include glycerol tri(meth)acrylate, trimethylolpropane tri(meth)acrylate, ethoxylated trimethylolpropane tri(meth)acrylate, propoxylated trimethylolpropane tri(meth)acrylate, ditrimethylolpropane tetra(meth)acrylate, pentaerythritol tetra(meth)acrylate, ethoxylated pentaerythritol tetra(meth)acrylate, propoxylated pentaerythritol tetra(meth)acrylate, and dipentaerythritol penta(meth)acrylate. Other suitable (meth)acrylate oligomers include (meth)acrylate of epoxidized soya oil, urethane acrylates of polyisocyanates and hydroxyalkyl (meth)acrylates and polyester acrylates. Mixtures of (meth)acrylate monomers may also be used, including mixtures of mono, di, tri, and/or tetra (meth)acrylates.

Other suitable poly(meth)acrylates include urethane (meth)acrylates such as those formed from the reaction of a hydroxyl functional (meth)acrylate with a polyisocyanate or with an NCO functional adduct of a polyisocyanate and a polyol or a polyamine. Suitable hydroxyl functional (meth) acrylates include any of those listed herein. Suitable polyisocyanates include, without limitation, any of the monomeric or oligomeric isocyanates, or isocyanate prepolymers listed herein.

The equivalent ratio of polyamine:dialkyl maleate and/or dialkyl fumarate:(meth)acrylate can vary according to the present invention, depending on the needs of the user. In certain embodiments, the equivalent ratio of amine to dialkyl maleate and/or dialkyl fumarate and (meth)acrylate groups (taken together) is stoichiometric, and in other certain embodiments, the amine is used in slight excess, such as up to 1.05, or less than 1.03, amino groups per dialkyl maleate and/or dialkyl fumarate and/or (meth)acrylate groups. These ratios are chosen to minimize residual dialkyl maleate and/or dialkyl fumarate, and (meth)acrylate, as well as to minimize the amount of unreacted primary amine in the final product. In certain embodiments, the reaction product is substantially free of unreacted primary amino groups, and in other embodiments, the coating compositions of the present invention are substantially free of primary amine groups. Minimizing the amount of residual primary amine in the (meth)acrylate/aspartate amine curative slows its rate of reaction with isocyanate; thus, the ratio of polyamine:dialkyl maleate and/or dialkyl fumarate:(meth)acrylate can be varied depending on the level of reactivity desired in the resulting (meth)acrylate/ aspartate amine curative.

In certain embodiments, the equivalent ratio of amino groups to dialkyl maleate and/or dialkyl fumarate is 1:0.1 to 1:0.3 and the equivalent ratio of amino groups to (meth) acrylate is 1:0.9 to 1:0.7.

The reaction products described above may include additives such as free radical polymerization inhibitors such as hydroquinone, 4-methoxyphenol, 2,6-di-tert-butyl p-cresol, and phenothiazine, catalysts including but not limited to tin compounds (dibutyltin dilaurate, dibutyltin diacetate), Zn compounds, Ti compounds, tertiary amines, and solvents including but not limited to alcohols. The reaction products of the present invention can be diluted to lower their viscosity, such as with other amine curatives; combinations of reaction products resulting from different combinations of polyamines, dialkyl maleates and/or dialkyl fumarates, and/or (meth)acrylates can also be used to achieve desired properties.

The present invention is further directed to a method for preparing a (meth)acrylate/aspartate amine curative comprising reacting a) a polyamine, b) a dialkyl maleate and/or dialkyl fumarate, and c) a (meth)acrylate. Any of the polyamines, dialkyl maleates and/or dialkyl fumarates, and (meth)acrylates described above can be used, in either the ratios described above or other ratios. The polyamine can be reacted first with the dialkyl maleate and/or dialkyl fumarate, and then with the (meth)acrylate, first with the (meth)acrylate and then the dialkyl maleate and/or dialkyl fumarate, or simultaneously with the dialkyl maleate and/or dialkyl fumarate and the (meth)acrylate. Any suitable method for preparing the curative can be used, including those discussed below in the examples. In certain embodiments the dialkyl maleate and/or dialkyl fumarate is not subjected to (trans)esterification with a diol, triol, or tetraol. Thus, unsaturated oligoesters prepared by (trans)esterification of a dialkyl maleate and/or dialkyl fumarate with a diol, triol, or tetraol are specifically excluded from certain embodiments, as are unsaturated oligoesters prepared by esterification of maleic acid and fumaric acid with a diol, triol, or tetraol.

The present invention is further directed to a polyurea comprising one or more of the (meth)acrylate/aspartate amine curatives described above and an isocyanate. Any of the (meth)acrylate/aspartate amines or combinations thereof described above can be used in forming the polyureas of the present invention. Other amine curatives know in the art can also be used in combination with the present (meth)acrylate/aspartate amines.

Suitable isocyanates for use in the present invention may include but are not limited to isophorone diisocyanate (IPDI), which is 3,3,5-trimethyl-5-isocyanatomethylcyclohexyl isocyanate; hydrogenated materials such as cyclohexylene diisocyanate, 4,4'-methylenedicyclohexyl diisocyanate ($H_{12}$MDI); mixed aralkyl diisocyanates such as tetramethylxylyl diisocyanates, $OCN—C(CH_3)_2—C_6H_4C(CH_3)_2—NCO$; polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate; and mixtures thereof.

Examples of aromatic isocyanates for use in the present invention may include but are not limited to phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylene-interrupted aromatic diisocyanates such as methylenediphenyl diisocyanate, 4,4'-isomer (MDI) including alkylated analogs such as 3,3'-dimethyl-4,4'-diphenylmethane diisocyanate, polymeric methylenediphenyl diisocyanate; and mixtures thereof.

In certain embodiments an excess of polyisocyanate monomer (i.e., residual free monomer from the preparation of prepolymer) may be used to decrease the viscosity of the polyurea composition thereby improving its flowability, and, when used in a coating, may provide improved adhesion of the polyurea coating to a previously applied coating and/or to an uncoated substrate. For example, the coatings that have previously been applied to a substrate can comprise functional groups (e.g. hydroxyl groups) that are reactive with isocyanates, thereby enhancing adhesion of this coating to the polyurea composition applied over this coating. A lower viscosity polyurea composition may also remain in a "flowable" state for a longer period of time as compared to a comparable composition having a higher viscosity. In alternate embodiments of the present invention, at least 1 percent by weight, or at least 2 percent by weight, or at least 4 percent by weight of the isocyanate component comprises at least one polyisocyanate monomer (i.e. residual free polyisocyanate monomer).

In a further embodiment of the invention, the isocyanate can include oligomeric polyisocyanates including but not limited to dimers, such as the uretdione of 1,6-hexamethylene diisocyanate, trimers, such as the biuret and isocyanurate of 1,6-hexanediisocyanate and the isocyanurate of isophorone diisocyanate, and polymeric oligomers. Modified polyisocyanates can also be used, including but not limited to carbodiimides and uretone-imines, and mixtures thereof. Suitable materials include but are not limited to those available under the name DESMODUR from Bayer Corporation of Pittsburgh, Pa. and include, for example, DESMODUR N 3200, DESMODUR N 3300, DESMODUR N 3400, DESMODUR XP 2410, and DESMODUR XP 2580.

In certain embodiments, the isocyanate is in the form of a prepolymer. As used herein, "prepolymer" means polyisocyanate that is pre-reacted with polyamine and/or another isocyanate reactive group such as polyol. Suitable polyisocyanates include those disclosed herein. Suitable polyamines are numerous and selected from a wide variety known in the art. Examples of suitable polyamines include but are not limited to primary and secondary amines, and mixtures thereof, such as any of those listed above. Amines comprising tertiary amine functionality can be used provided that the amine further comprises at least two primary and/or secondary amino groups. Suitable polyols are numerous and selected from a wide variety known in the art. Examples of suitable polyols may include but are not limited to polyether polyols, polyester polyols, polyurea polyols (e.g. the Michael reaction product of an amino functional polyurea with a hydroxyl functional (meth)acrylate), polycaprolactone polyols, polycarbonate polyols, polyurethane polyols, polyvinyl alcohols, addition polymers of unsaturated monomers with pendant hydroxyl groups such as those containing hydroxy functional (meth)acrylates, allyl alcohols and mixtures thereof.

The polyurea comprising the present (meth)acrylate/aspartate amine curative and an isocyanate can additionally include other amines such as those known in the art including but not limited to any polyamines or combinations thereof listed herein. Other amines include secondary cycloaliphatic diamines such as JEFFLINK 754 (Huntsman Corporation, Houston, Tex.) and CLEARLINK 1000 (Dorf-Ketal Chemicals, LLC), aspartic ester functional amines, such as those available under the name DESMOPHEN such as DESMOPHEN NH1220, DESMOPHEN NH 1420, and DESMOPHEN NH 1520 (Bayer Corporation), other aspartic ester functional materials, such as the reaction products of triamines that comprise at least one secondary amino group prior to reaction with a dialkyl maleate and/or dialkyl fumarate including but not limited to the reaction products of diethylene triamine, dipropylene triamine, and bis-hexamethylene triamine with dialkyl maleate and/or dialkyl fumarate as described herein; examples of such materials include the adduct of dipropylene triamine and diethyl maleate, the adduct of dipropylene triamine and dibutyl maleate, the adduct of bis-hexamethylene triamine with diethyl maleate, and the adduct of bis-hexamethylene triamine with dibutyl maleate. Polyoxyalkyleneamines are also suitable. Polyoxyalkyleneamines comprise two of more primary or secondary amino groups attached to a backbone, derived, for example, from propylene oxide, ethylene oxide, butylene oxide or a mixture thereof. Examples of such amines include those available under the designation JEFFAMINE, such as, without limitation, JEFFAMINE D-230, D-400, D-2000, HK-511, ED-600, ED-900, ED-2003, T-403, T-3000, T-5000, SD-231, SD-401, SD-2001, and ST-404 (Huntsman Corporation). Such amines have an approximate molecular weight ranging from 200 to 7500.

Other secondary amines that can be included in the present compositions are (meth)acrylate modified amines. By "(meth)acrylate modified amines" is meant reaction products of amines with mono- and/or poly-(meth)acrylates as well as reaction products of mono- and/or poly-amines with (meth)acrylates. Examples of suitable amines include all amines comprising primary amino functionality previously listed herein, as well as monoamines. Suitable monoamines include but are not limited to primary amines of the formula $R_2$—$NH_2$, where $R_2$ is a hydrocarbon radical that may be represented by a straight chain or branched alkyl group, an aryl-alkyl group, a hydroxyalkyl group or an alkoxyalkyl group. Suitable (meth)acrylates include all (meth)acrylates including but not limited to those listed herein.

Other suitable secondary amines that can be included in the present composition are reaction products of materials comprising primary amine functionality with acrylonitrile. Suitable amines include any polyamine listed herein comprising primary amino functionality. One example of such a material is the adduct of 4,4'-diaminodicyclohexylmethane and acrylonitrile. An example of a commercially available material is the adduct of isophorone diamine and acrylonitrile sold under the designation POLYCLEAR 136, (Hansen Group LLC).

Polyols can also be included in the present composition, such as those previously listed herein.

The present invention is further directed to a coating composition comprising a polyurea formed from a reaction mixture comprising an isocyanate and amine, wherein the amine comprises a (meth)acrylate/aspartate amine curative, such as any one or more of the (meth)acrylate/aspartate amine curatives described above. In certain embodiments, the ratio of equivalents of isocyanate groups to equivalents of amine group in the polyurea is greater than 1 and the isocyanate and the amine can be applied to a substrate at a volume mixing ratio of 1:1.

As used herein, the term "polyurea" includes the reaction product of an isocyanate and an amine, such as an (meth)acrylate/aspartate amine as described herein. It will be appreciated by those skilled in the art, that polyurethane can be formed as a byproduct in the reactions of the present invention. Thus, the term "polyurea" as used herein includes both polyurea and blends of polyurea and polyurethane.

The coating compositions of the present invention may be formulated and applied using various techniques known in the art. In an embodiment, conventional spraying techniques may be used. In certain embodiments, the isocyanate and amine, including the (meth)acrylate/aspartate amine curative, may be combined such that the ratio of equivalents of isocyanate groups to equivalents of amine groups is greater than 1 and the isocyanate and amine can be applied to a substrate at a volume mixing ratio of 1:1; the reaction mixture may be applied to an uncoated or coated substrate to form a first coating on the uncoated substrate or a subsequent coating on the coated substrate.

In an embodiment, the sprayable coating composition may be prepared using a two-component mixing device. In this embodiment, the isocyanate component and the amine component are added to a high pressure impingement mixing device. The isocyanate is added to the "A-side" and amine is added to the "B-side", for example. The A- and B-side streams are impinged upon each other and immediately sprayed onto at least a portion of an uncoated or coated substrate. The isocyanate and the amine react to produce a coating composition that cures after application to the uncoated or coated substrate. The A- and/or B-side can also be heated prior to application, such as to a temperature of 140° F. Heating may promote better mixing.

It is believed that in certain embodiments the ratio of equivalents of isocyanate groups to amine groups may be selected to control the rate of cure of the coating composition of the present invention. It has been found that cure and adhesion advantages may result when applying the coating in a 1:1 volume ratio wherein the ratio of the equivalents of isocyanate groups to amine groups (also known as the reaction index) is greater than one, such as from 1.01 to 1.10:1, or from 1.03 to 1.10:1, or from 1.05 to 1.08:1 or from 1.01 to 1.4 to 1 or from 1.01 to 1.5 to 1. For example, good adhesion has been observed when using the present coatings in these ratios over clearcoats that have low surface functionality after cure, such as carbamate melamine, hydroxyl melamine, 2K urethane and silane-containing clearcoats. The term "1:1 volume ratio" means that the volume ratio varies by up to 20% for each component, or up to 10% or up to 5%.

In a non-limiting embodiment, a commercially available mixing device available under the designation GUSMER VR-H-3000 proportioner fitted with a GUSMER Model GX-7 spray gun may be used. In this device, pressurized streams of the A- and B-side components are delivered from two separate chambers, and are impacted or impinged upon each other at high velocity to mix the two components and form a coating composition, which may be applied to an uncoated or coated substrate using the spray gun. The mixing forces experienced by the component streams may depend upon the volume of each stream entering the mixing chamber per unit time and the pressure at which the component streams are delivered. A 1:1 volume ratio of the isocyanate and amine per unit time may equalize these forces.

Another suitable application device known in the industry includes a "static mix tube" applicator. In this device, the isocyanate and amine are each stored in a separate chamber. As pressure is applied, each of the components is brought into a mixing tube in a 1:1 ratio by volume. Mixing of the components is effected by way of a torturous or cork screw pathway within the tube. The exit end of the tube may have atomization capability useful in spray application of the reaction mixture. Alternatively, the fluid reaction mixture may be applied to a substrate as a bead. A static mix tube applicator is commercially available from Cammda Corporation. Other application methods and other isocyanate:amine ratios can be used.

The coating compositions of the present invention may be applied to a wide variety of substrates. Non-limiting examples of suitable substrates can include but are not limited to metal, natural and/or synthetic stone, ceramic, glass, brick, cement, concrete, cinderblock, wood and composites and laminates thereof; wallboard, drywall, sheetrock, cement board, plastic, paper, PVC, styrofoam, plastic composites, acrylic composites, asphalt, fiberglass, soil, gravel and the like. Metals can include but are not limited to aluminum, cold rolled steel, electrogalvanized steel, hot dipped galvanized steel, titanium and alloys; plastics can include but are not limited to TPO, SMC, TPU, polypropylene, polycarbonate, polyethylene, polyamides (Nylon). The substrates can be primed metal and/or plastic; that is, an organic or inorganic layer is applied thereto. Further, the coating compositions of the present invention can be applied to said substrates to impart one or more of a wide variety of properties such as but not limited to corrosion resistance, abrasion resistance, impact damage, flame and/or heat resistance, chemical resistance, UV light resistance, structural integrity, ballistic mitigation, blast mitigation, sound dampening, decoration and the like. In non-limiting examples, the coating compositions of the present invention can be applied to at least a portion of the following substrates: an article of manufacture such as but not limited to a vehicle. "Vehicle" includes but is not limited to land-, water-, and air-vehicles, including civilian, commercial, and military vehicles, for example, cars, trucks, boats, ships, submarines, airplanes, helicopters, humvees and tanks. The article of manufacture can be a building structure. "Building structure" includes but is not limited to at least a portion of a structure including residential, commercial and military structures, for example, roofs, floors, support beams, walls and the like. As used herein, the term "substrate" may refer to a surface, either external or internal, on at least a portion of an article of manufacture or the article of manufacture itself. In an embodiment, the substrate is a truck bed.

In an embodiment, the coating compositions of the present invention may be applied to a carrier film. The carrier film can be selected from a wide variety of such materials known in the art. Non-limiting examples of suitable carrier films include, but are not limited to, thermoplastic materials, thermosetting materials, metal foils, cellulosic paper, synthetic papers, and mixtures thereof. As used herein, the term "thermoplastic material" refers to any material that is capable of softening or fusing when heated and of solidifying (hardening) again when cooled. Non-limiting examples of suitable thermoplastic materials may include polyolefins, polyurethanes, polyesters, polyamides, polyureas, acrylics, and mixtures thereof. As used herein, the term "thermosetting material" refers to any material that becomes permanently rigid after being heated and/or cured. Non-limiting examples include polyurethane polymers, polyester polymers, polyamide polymers, polyurea polymers, polycarbonate polymers, acrylic polymers, resins, copolymers thereof, aminoplasts, isocyanates, epoxies, and mixtures thereof.

As noted above, in certain embodiments, the coating compositions of the present invention may be applied to a bare (e.g., untreated, uncoated) substrate, a pretreated substrate and/or coated substrate having at least one other coating. In a non-limiting embodiment, the coating compositions of the present invention may be applied as part of a multi-layer coating composite. The first coating applied to a substrate may be selected from a variety of coating compositions known in the art for surface coating substrates. Non-limiting examples may include but are not limited to electrodepositable film-forming compositions, primer compositions, pigmented or non-pigmented monocoat compositions, pigmented or non-pigmented base coat compositions, transparent topcoat compositions, industrial coating compositions, and the like. In another non-limiting embodiment, the coating compositions of the present invention may be applied as part of a multi-layer coating composite comprising a pretreated substrate and coating layers such as but not limited to electrocoat, primer, base coat, clear coat, and/or combinations thereof. In an embodiment, the clearcoat comprises silane functional groups, either before or after crosslinking and cure.

In a further embodiment, the coating compositions of the present invention can be used in a two-coat application resulting in a textured surface. A first coat is applied to an uncoated or coated substrate to produce a smooth, substantially tack-free layer. The "Tack-Free Method" is used to determine if the layer is substantially tack-free. The Tack-Free Method includes spraying the coating composition in one coat onto a non-adhering plastic sheet to a thickness of from 10 to 15 mil (254-381 microns). When spraying is complete, an operator, using a loose fitting, disposable vinyl glove, such as one commercially available as AMBIDEX Disposable Vinyl Glove by Marigold Industrial, Norcross Ga., gently touches the surface of the coating. The coating may be touched more than one time by using a different fingertip. When the glove tip no longer sticks to, or must be pulled from, the surface of the layer, the layer is said to be substantially tack-free. The time beginning from the completion of spraying until when the coating is substantially tack-free is said to be the tack-free time. In a non-limiting embodiment, the tack-free time and the cure time may be controlled by balancing levels of various composition components such as the ratio of primary amine to secondary amine; secondary amine includes the (meth) acrylate/aspartate amine curative of the present invention.

A second coat may then be applied to the first coating layer as a texturizing layer or "dust coating". The second coating layer can be applied by increasing the distance between the application/mixing device and the coated substrate to form discrete droplets of the coating composition prior to contacting the coated substrate thereby forming controlled non-uniformity in the surface of the second layer. The substantially tack-free first layer of the coating is at least partially resistant to the second layer; i.e., at least partially resistant to coalescence of the droplets of coating composition sprayed thereon as the second layer or dust coating such that the droplets adhere to but do not coalesce with the previous layer(s) to create surface texture. The final coating layer typically exhibits more surface texture than the first or previous coating layers. An overall thickness of the coating layers may range from 20 to 1000 mils, or from 40 to 150 mils, or from 60 to 100 mils (1524-2540 microns), or from 500 to 750 mils. In a non-limiting embodiment, the first layer may be the majority of the total thickness and the dust coating may be from 15-50 mils (381-1270 microns).

In various embodiments of the present invention, the "first" coating layer may comprise one, two, three or more layers; and the "second" coating layer may be one or more subsequent layers applied thereover. For example, four polyurea layers may be applied, with the fourth layer being the dust coating and each layer having a thickness of from 15 to 25 mil (381-635 microns). It will be appreciated that these coating layers are relatively "thick". The coating compositions of the present invention can also be applied as much thinner layers as well, such as 0.1 to less the 15 mils, such as 0.1 to 10, 0.5 to 3 or 1 to 2 mils. Such layers can be used alone or in conjunction with other coating layers, such as any of those known in the art or otherwise described herein.

In alternate embodiments, the coating layers may comprise the same or different polyurea coating compositions. For example, the first layer may be a polyurea composition comprising aliphatic and/or aromatic amine and/or aliphatic and/or aromatic polyisocyanate; and the second layer may comprise the same or different combination of aliphatic and/or aromatic amine and/or aliphatic and/or aromatic polyisocyanate. The amine of the first and/or second layer can comprise the (meth)acrylate/aspartate amine curatives described herein. In a further embodiment, the outermost coating layer may comprise a coating composition that provides a desired durability. The desired durability may depend upon the use of the coating composition of the present invention and/or the substrate to which it may be applied. In an embodiment, a combination of aliphatic and/or aromatic amine and/or polyisocyanate may be selected such that the composition of the outermost layer has substantial durability. For example, the outermost coating layer may have a durability of 1000 kJ to 6000 kJ, or from 800 hours to 4000 hours, when tested using a Weatherometer (Atlas Material Testing Solutions) in accordance with method SAE J1960. In this embodiment, the first layer may be a polyurea composition comprising polyisocyanate and amine, wherein at least one of the amine and/or polyisocyanate may comprise an aromatic moiety, and the second layer may be a polyurea composition comprising predominantly aliphatic amine and aliphatic polyisocyanate, with little or no aromaticity.

The coating compositions of the present invention may optionally include materials standard in the art including but not limited to fillers, flame retardants, fiberglass, stabilizers, thickeners, adhesion promoters, catalysts, colorants, antioxidants, UV absorbers, hindered amine light stabilizers, rheology modifiers, flow additives, anti-static agents and other performance or property modifiers that are known in the art of surface coatings, and mixtures thereof. In alternate embodiments, such additives may be combined with the isocyanate, the amine, or both.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated by grinding into the coatings by use of a grind vehicle, such as an acrylic grind vehicle, the use of which will be familiar to one skilled in the art. The grind vehicle can also comprise the (meth)acrylate/aspartate amine curative of the present invention either alone or in combination with any of the other amines and/or polyols described herein.

Example pigments and/or pigment compositions include, but are not limited to, carbazole dioxazine crude pigment, azo, monoazo, disazo, naphthol AS, salt type (lakes), benzimidazolone, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent based such as pthalo green or blue, iron oxide, bismuth vanadate, anthraquinone, perylene, aluminum, and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

In an embodiment, the polyurea coating compositions of the present invention comprise a colorant or colorants such that the color of the coating substantially matches that of the surrounding substrate. As used herein, the term "matches" or like terms when referring to color matching means that the color of the coating composition of the present invention substantially corresponds to a desired color or the color of an associated substrate. For instance, when the substrate to which the polyurea coating composition is applied to a portion of a vehicle, such as a truck bed, the color of the coating substantially matches that of the associated vehicle body. This can be visually observed or confirmed using spectroscopy equipment.

As used herein, unless otherwise expressly specified, all numbers such as those expressing values, ranges, amounts or percentages may be read as if prefaced by the word "about", even if the term does not expressly appear. Also, any numerical range recited herein is intended to include all subranges subsumed therein. Singular encompasses plural and vice versa. For example, although reference is made herein including the claims to "a" polyamine, "a" dialkyl maleate and/or dialkyl fumarate, "a" (meth)acrylate, "a" (meth)acrylate/aspartate amine, "an" isocyanate, and the like, mixtures of any of these can be used. As used herein, the term "polymer" refers to oligomers and both homopolymers and copolymers, and the prefix "poly" refers to two or more.

EXAMPLES

The following examples are intended to illustrate the invention and should not be construed as limiting the invention in any way. As will be appreciated by those skilled in the art, MW refers to average molecular weight, $M_w$ refers to weight average molecular weight, and $M_n$ refers to number average molecular weight.

Example A

An acrylate/aspartate amine curative was prepared from the following ingredients:

| Ingredient | Wt in g |
| --- | --- |
| Charge 1 | |
| Isophorone diamine | 2982.0 |
| 2,6-di-tert-butyl p-cresol | 3.5 |
| Charge 2 | |
| Dibutyl maleate | 1995.0 |

-continued

| Ingredient | Wt in g |
| --- | --- |
| Charge 3 | |
| 2,6-di-tert-butyl p-cresol | 3.5 |
| Charge 4 | |
| Butyl acrylate | 3270.4 |

Charge 1 was added to a suitable flask equipped with an overhead stirrer, thermocouple, condenser, and $N_2$ inlet. The charge was placed under a $N_2$ blanket. Beginning at a temperature of 21° C., Charge 2 was added to the flask over a period of 5.75 hours. A mild exotherm was observed during the addition. A maximum temperature of 35° C. was observed during the addition of this charge. At the completion of the charge, the temperature of the reaction mixture was 33° C. The reaction mixture was heated to a temperature of 35-37° C. with an external heat source and held at this temperature for 3 hours. Inspection of the infrared spectrum of the reaction mixture indicated consumption of dibutyl maleate (disappearance of peak at 1646 $cm^{-1}$). Charge 3 was added to the reactor, and the reaction mixture heated to 43° C. Charge 4 was added to the reaction mixture for 3.6 hours; a mild exotherm was observed. The temperature range of the reaction mixture over the course of Charge 4 was between 43 and 50° C.; at the completion of Charge 4 the temperature was 45° C. The temperature of the reaction mixture was then raised to 50° C. and held for 3 hours. Inspection of the infrared spectrum of the reaction mixture indicated the presence of unreacted acrylate (peaks at 1621, 1635 $cm^{-1}$). The temperature of the reaction mixture was raised to 70° C. and held for 10.9 hours. Inspection of the infrared spectrum of the reaction mixture indicated that the aforementioned peaks attributed to the acrylate could not be distinguished from baseline noise; at this point the reaction was judged to be complete. The resulting material was found to have measured solids content (110° C., 1 hr) of 98.9 percent, a viscosity of D on the Gardner-Holt scale, a density of 8.17 lb/gal, a total amine content of 4.21 meq/g, a residual primary amine content of 0.230 meq/g, a secondary amine content of 3.985 meq/g, a tertiary amine content of 0.000 meq/g, and a $M_w$ of 450 and a $M_n$ of 406 as determined by gel permeation chromatography vs. a polystyrene standard.

Example B

An acrylate/aspartate amine curative was prepared from the following ingredients:

| Ingredient | Wt in g |
| --- | --- |
| Charge 1 | |
| Isophorone diamine | 383.4 |
| 2,6-di-tert-butyl p-cresol | 0.45 |
| Charge 2 | |
| Diethyl maleate | 193.5 |
| Charge 3 | |
| 2,6-di-tert-butyl p-cresol | 0.45 |
| Charge 4 | |
| Ethyl acrylate | 328.5 |

Charge 1 was added to a suitable flask equipped with an overhead stirrer, thermocouple, condenser, and $N_2$ inlet. The charge was placed under a $N_2$ blanket. Beginning at a temperature of 23° C., Charge 2 was added to the flask over a period of 20 minutes. A mild exotherm was observed during the addition which was controlled by application of an ice bath. A maximum temperature of 33° C. was observed during the addition of this charge. At the completion of the charge, the temperature of the reaction mixture was 28° C. The reaction mixture was heated to a temperature of 35-38° C. with an external heat source and held at this temperature for 2.2 hours. Inspection of the infrared spectrum of the reaction mixture indicated the presence of diethyl maleate (peak at 1646 cm$^{-1}$). The temperature was raised to 50-51° C. and the reaction mixture held for 7.6 hours. Inspection of the infrared spectrum of the reaction mixture indicated consumption of diethyl maleate. The temperature of the reaction mixture was taken to 41° C. and Charge 3 was added to the reactor. Charge 4 was added to the reaction mixture over 25 minutes; at the completion of Charge 4 the temperature was 39° C. The temperature of the reaction mixture was then raised to 50° C. and held for 3 hours. Inspection of the infrared spectrum of the reaction mixture indicated the presence of unreacted acrylate (peaks at 1621, 1635 cm$^{-1}$). The temperature of the reaction mixture was raised to 70° C. and held for 7.5 hours, then raised to 80° C. and held for 3.75 hours. Inspection of the infrared spectrum of the reaction mixture indicated that the presence the aforementioned peaks attributed to the acrylate were not present; at this point the reaction was judged to be complete. The resulting material was found to have measured solids content (110° C., 1 hr) of 95.5 percent, a viscosity of B on the Gardner-Holt scale, a density of 8.34 lb/gal, a total amine content of 5.096 meq/g, a residual primary amine content of 0.003 meq/g, a secondary amine content of 5.093 meq/g, a tertiary amine content of 0.000 meq/g, and a $M_w$ of 356 and a $M_n$ of 321 as determined by gel permeation chromatography vs. a polystyrene standard.

Example C

A methacrylate/aspartate amine curative was prepared from the following ingredients:

| Ingredient | Wt in g |
| --- | --- |
| Charge 1 | |
| Isophorone diamine | 173.4 |
| Methyl methacrylate | 163.2 |
| 2,6-di-tert-butyl p-cresol | 2.2 |
| Methanol | 54.9 |
| Dibutyltin dilaurate | 1.68 |
| Charge 2 | |
| Diethyl maleate | 49.4 |
| Charge 3 | |
| 4-methoxyphenol | 0.7 |

Charge 1 was added to a suitable flask equipped with an overhead stirrer, thermocouple, condenser, and sparge tube. The charge was placed under a light air sparge of approximately 0.5 SCFH. The reaction mixture was heated to a temperature of 80° C. and held at this temperature for approximately 27 hours. The progress of the reaction was followed by measuring solids (110° C., 1 hour). The reaction mixture was held to a measured solids 77.9%. The reaction mixture adjusted a temperature of 49° C. Charge 2 was added to the reactor over 5 minutes; at the end of this addition, the temperature was 52° C. The reaction mixture was heated to 60° C. and held for 4.75 hours. Inspection of the infrared spectrum of the reaction mixture indicated the presence of diethyl maleate (peak at 1646 cm$^{-1}$). The reaction temperature was increased to 70° C. and held for 3.9 hours. Inspection of the infrared spectrum of the reaction mixture indicated consumption of diethyl maleate. The temperature of the reaction mixture was reduced to 50° C. Charge 3 was added and the reactor configured for vacuum distillation. Vacuum was applied to the reaction mixture for 1.25 hours to remove any volatiles; the temperature range was 45-61° C. and the maximum vacuum obtained was 75 mm Hg. The resulting material was found to have measured solids content (110° C., 1 hr) of 95.8 percent, a viscosity of Z1- on the Gardner-Holt scale, a density of 8.41 lb/gal, a total amine content of 4.945 meq/g, a residual primary amine content of 0.118 meq/g, a secondary amine content of 4.827 meq/g, a tertiary amine content of 0.000 meq/g, an methyl methacrylate, methanol, and diethyl maleate content of 0.15, 0.19, and 0.11 percent by gas chromatography, and a $M_w$ of 389 and a $M_n$ of 330 as determined by gel permeation chromatography vs. a polystyrene standard.

Example D

A hydroxy acrylate/aspartate amine curative was prepared from the following ingredients:

| Ingredient | Wt in g |
| --- | --- |
| Charge 1 | |
| Isophorone diamine | 165.3 |
| 2,6-di-tert-butyl p-cresol | 0.2 |
| Charge 2 | |
| Dibutyl maleate | 110.6 |
| Charge 3 | |
| 2,6-di-tert-butyl p-cresol | 0.2 |
| Charge 4 | |
| Hydroxyethyl acrylate | 164.3 |

Charge 1 was added to a suitable flask equipped with an overhead stirrer, thermocouple, condenser, and $N_2$ inlet. The charge was placed under a $N_2$ blanket. Beginning at a temperature of 23° C., Charge 2 was added to the flask over a period of 13 minutes. A mild exotherm was observed during the addition which was controlled by application of an ice bath. A maximum temperature of 32° C. was observed during the addition of this charge. At the completion of the charge, the temperature of the reaction mixture was 25° C. The reaction mixture was heated to a temperature of 34-35° C. with an external heat source and held at this temperature for 3.6 hours. Inspection of the infrared spectrum of the reaction mixture indicated the presence of dibutyl maleate (peak at 1646 cm$^{-1}$). The temperature was raised to 48-50° C. and the reaction mixture held for 6.6 hours. Inspection of the infrared spectrum of the reaction mixture at this point indicated consumption of dibutyl maleate. Charge 3 was added to the reactor and the temperature of the reaction mixture was taken to 39° C. Charge 4 was added to the reaction mixture over 24 minutes. A maximum temperature of 48° C. was observed during the addition. At the completion of Charge 4 the temperature was 44° C. The temperature of the reaction mixture was then raised to 50° C. and held for 3.1 hours. Inspection of the infrared spectrum of the reaction mixture indicated the presence of unreacted acrylate (peaks at 1621, 1635 cm$^{-1}$). The temperature of the reaction mixture was raised to 70° C. and held for 4.75 hours. Inspection of the infrared spectrum of the reaction mixture indicated that the aforementioned peaks attributed to the acrylate were not present; at this point the reaction was judged to be complete. The resulting material was found to have measured solids content (110° C., 1 hr) of 94.4 percent, a viscosity of Z6+ on the Gardner-Holt scale, a density of 8.86 lb/gal, a total amine content of 4.266 meq/g, a residual primary amine content of 0.000 meq/g, a secondary amine content of 4.266 meq/g, a tertiary amine content of 0.000 meq/g, and a $M_w$ of 669 and a $M_n$ of 498 as determined by gel permeation chromatography vs. a polystyrene standard.

Example E

A hydroxyl functional maleate was prepared from the following ingredients:

| Ingredient | Wt in g |
|---|---|
| Charge 1 | |
| Maleic anhydride | 294.2 |
| Charge 2 | |
| 1-propanol | 189.0 |
| Charge 3 | |
| Triphenylphosphine | 1.45 |
| Triphenylphosphite | 1.45 |
| Charge 4 | |
| 1,2-epoxybutane | 237.7 |

Charge 1 was added to a suitable flask equipped with an overhead stirrer, thermocouple, dry ice condenser, and N$_2$ inlet. The charge was placed under a N$_2$ blanket. The charge was heated with a water bath until all the maleic anhydride briquettes were melted (maximum temperature 67° C.). Heating was then switched to a heating mantle and the charge was taken to a temperature of 80° C. Charge 2 was added to the reaction mixture over a period of 28 minutes. The temperature of the reaction mixture at the completion of this charge was 89° C. The reaction mixture was held at this temperature for 1.5 hrs, then at 90° C. for 0.8 hrs. At this point the reaction of maleic anhydride with 1-propanol was determined to be complete by inspection of the infrared spectrum of the reaction mixture. Charge 3 was added to the reactor, followed by Charge 4 over a period of approximately 1.75 hours. The maximum temperature during the charge was 101° C. The material was held at 90° C. for 20.75 hours. The acid value of the reaction mixture was found to be 26.0, and the epoxy equivalent weight was found to be infinite. Additional 1,2-epoxybutane (30.6 g) was added to the reactor, and the reaction mixture was held at 90° C. for another 11 hours. The acid value of the reaction mixture was found to be 7.85 at this point, and the epoxy equivalent weight was determined to be 9259. The reaction mixture was held for an additional 2.3 hours, and then the temperature of the reaction mixture was raised to 100° C., and held at this temperature for 7.6 hours. The acid value was determined to be 4.77 at this point, and the epoxy equivalent was found to be 18868. At a temperature of 50° C., vacuum (40 mm Hg) was applied to the reaction mixture for 1.9 hours to remove volatiles. The final reaction product had a viscosity of A on the Gardner-Holt scale, an acid value of 4.0, and an epoxy equivalent weight of 19608.

Example F

An acrylate/aspartate amine curative was prepared from the following ingredients:

| Ingredient | Wt in g |
|---|---|
| Charge 1 | |
| Isophorone diamine | 149.1 |
| 2,6-di-tert-butyl p-cresol | 0.18 |
| Charge 2 | |
| Maleic anhydride/1-propanol/1,2-epoxybutane maleate adduct of Example E | 201.3 |
| Charge 3 | |
| 2,6-di-tert-butyl p-cresol | 0.18 |
| Charge 4 | |
| Butyl acrylate | 107.5 |

Charge 1 was added to a suitable flask equipped with an overhead stirrer, thermocouple, condenser, and N$_2$ inlet. The charge was placed under a N$_2$ blanket. Beginning at a temperature of 24° C., Charge 2 was added to the flask over a period of 28 minutes. A mild exotherm was observed during the addition which was controlled by application of an ice bath. A maximum temperature of 37° C. was observed during the addition of this charge. At the completion of the charge, the temperature of the reaction mixture was 31° C. The reaction mixture was heated to a temperature of 35° C. with an external heat source and held at this temperature for 3.8 hours. Inspection of the infrared spectrum of the reaction mixture indicated the presence of the adduct of Example E (peak at 1646 cm$^{-1}$). The temperature was raised to 40° C. and the reaction mixture held for an additional 4.75 hours. Inspection of the infrared spectrum of the reaction mixture at this point indicated consumption of the Example E adduct. At a temperature of 29° C., Charge 3 was added to the reactor. Charge 4 was added to the reaction mixture over 7 minutes; the temperature range of the reaction mixture over the course of Charge 4 was between 29 and 31° C. The temperature of the reaction mixture was then raised to 49° C. and held for 16.8 hours. Inspection of the infrared spectrum of the reaction mixture indicated consumption of the acrylate (absence of peaks at 1621, 1635 cm$^{-1}$). The resulting material was found to have measured solids content (110° C., 1 hr) of 95.7 percent, a viscosity of Z2 on the Gardner-Holt scale, a density of 8.47 lb/gal, a total amine content of 3.719 meq/g, a residual primary amine content of 0.022 meq/g, a secondary amine content of 3.697 meq/g, a tertiary amine content of 0.000 meq/g, and a $M_w$ of 692 and a $M_n$ of 501 as determined by gel permeation chromatography vs. a polystyrene standard.

Example G

A partially aspartate functional amine was prepared from the following ingredients:

| Ingredient | Wt in g |
| --- | --- |
| Charge 1 | |
| Isophorone diamine | 596.4 |
| 2,6-di-tert-butyl p-cresol | 0.7 |
| Charge 2 | |
| Dibutyl maleate | 798.0 |

Charge 1 was added to a suitable flask equipped with an overhead stirrer, thermocouple, condenser, and $N_2$ inlet. The charge was placed under a $N_2$ blanket. Beginning at a temperature of 22° C., Charge 2 was added to the flask over a period of 2.7 hours. A mild exotherm was observed during the addition which was controlled by application of an ice bath. A maximum temperature of 32° C. was observed during the addition of this charge. At the completion of the charge, the temperature of the reaction mixture was 31° C. The reaction mixture was heated to a temperature of 35° C. with an external heat source and held at this temperature for 3.8 hours. Inspection of the infrared spectrum of the reaction mixture indicated the presence of dibutyl maleate (peak at 1646 cm$^{-1}$). The reaction mixture was then heated for an additional 4.9 hours. Inspection of the infrared spectrum of the reaction mixture at this point indicated consumption of dibutyl maleate. The resulting material was found to have measured solids content (110° C., 1 hr) of 89.0 percent, a viscosity of D on the Gardner-Holt scale, a density of 8.18 lb/gal, a total amine content of 4.926 meq/g, a primary amine content of 2.541 meq/g, a secondary amine content of 2.385 meq/g, and a tertiary amine content of 0.000 meq/g.

Example H

An acrylate terminal amine adduct was prepared from the following ingredients:

| Ingredient | Wt in g |
| --- | --- |
| Charge 1 | |
| 1,6-hexamethylene diacrylate | 684.8 |
| 4-methoxyphenol | 0.5 |
| Charge 2 | |
| 2,2'-dimethyl-4,4'-methylenebis cyclohexylamine | 361.2 |

Charge 1 was added to a suitable flask equipped with an overhead stirrer, thermocouple, condenser, and air inlet. The charge was placed under an air blanket and heated to 37° C. Charge 2 was added to the flask over 40 minutes at this temperature. Immediately after Charge 2 was complete a sample was taken inspection by attenuated total reflectance (ATR) infrared spectroscopy. Over the next 1.5 hours the temperature of the reaction mixture was gradually increased to 77° C. The reaction mixture was again sampled at this point for ATR infrared spectroscopy. The reaction mixture was held between 74-77° C. for 12.1 hours with periodic sampling for ATR infrared spectroscopy. The reaction was determined to be complete when there was no further change in the peaks at 1621 and 1635 cm$^{-1}$. The resulting material was found to have measured solids content (110° C., 1 hr) of 87.6 percent, a viscosity of Z1 on the Gardner-Holt scale, a total amine content of 2.882 meq/g, a primary amine content of 0.007 meq/g, a secondary amine content of 2.875 meq/g, a tertiary amine content of 0.000 meq/g, a $M_w$ of 2070, a $M_n$ of 891, and $M_z$ of 3079 as determined by gel permeation chromatography vs. a polystyrene standard.

Example I

An oligomeric aspartate/acrylate amine curative was prepared from the following ingredients:

| Ingredient | Wt in g |
| --- | --- |
| Charge 1 | |
| Partially aspartate functional amine of Example G | 246.3 |
| 2,6-di-tert-butyl p-cresol | 0.4 |
| Charge 2 | |
| Acrylate terminal amine adduct of Example H | 207.5 |

Charge 1 was added to a suitable flask equipped with an overhead stirrer, thermocouple, condenser, and air inlet. The charge was placed under an air blanket and heated to 40° C. Charge 2 was added to the reaction mixture over 75 minutes between 40-41° C. The reaction temperature was increased to 75° C. and held for 6.1 hours. Inspection of the infrared spectrum of the reaction mixture indicated the presence of unreacted acrylate (peaks at 1621, 1635 cm$^{-1}$). The temperature of the reaction mixture was raised to 85° C. and held for 4.8 hours. Inspection of the infrared spectrum of the reaction mixture still indicated the presence of acrylate. An additional 5.6 g of Charge 1 was added to the reaction mixture and reaction held another 4.8 hours. At this point, the infrared spectrum of the mixture indicated that the acrylate had been consumed. The resulting material was found to have measured solids content (110° C., 1 hr) of 99.9 percent, a density of 8.52 lb/gal, a viscosity of Z6 on the Gardner-Holt scale, a total amine content of 3.967 meq/g, a primary amine content of 0.021 meq/g, a secondary amine content of 3.855 meq/g, a tertiary amine content of 0.091 meq/g, a $M_w$ of 2424, a $M_n$ of 825, and a $M_z$ of 3896 as determined by gel permeation chromatography vs. a polystyrene standard.

Example J

An acrylate/aspartate amine curative was prepared from the following ingredients:

| Ingredient | Wt in g |
| --- | --- |
| Charge 1 | |
| Isophorone diamine | 170.4 |
| 2,6-di-tert-butyl p-cresol | 0.2 |
| Charge 2 | |
| Dibutyl maleate | 114.0 |
| Butyl acrylate | 179.2 |

Charge 1 was added to a suitable flask equipped with an overhead stirrer, thermocouple, condenser, and $N_2$ inlet. The charge was placed under a $N_2$ blanket. Beginning at a temperature of 22° C., Charge 2 was added to the flask over a period of 50 min. A mild exotherm was observed during the addition. At the completion of the charge, the temperature of the reaction mixture was 41° C. The reaction mixture was heated to a temperature of 50° C. with an external heat source and held at this temperature for 6.7 hours. Inspection of the infrared spectrum of the reaction mixture indicated the presence of dibutyl maleate and butyl acrylate (peaks at 1621, 1635, 1646 cm$^{-1}$). The temperature of the reaction mixture was raised to 70° C. and held for 4.25 hours. Inspection of the infrared spectrum of the reaction mixture Inspection of the infrared spectrum of the reaction mixture indicated that the reaction was complete. The resulting material was found to have measured solids content (110° C., 1 hr) of 97.2 percent, a viscosity of A-B on the Gardner-Holt scale, a density of 8.13 lb/gal, a total amine content of 4.35 meq/g, a residual primary amine content of 0.432 meq/g, a secondary amine content of 3.773 meq/g, a tertiary amine content of 0.154 meq/g, and a $M_w$ of 468 and a $M_n$ of 438 as determined by gel permeation chromatography vs. a polystyrene standard.

Example K

An acrylate/aspartate amine curative was prepared from the following ingredients:

| Ingredient | Wt in g |
| --- | --- |
| Charge 1 | |
| Isophorone diamine | 170.4 |
| 2,6-di-tert-butyl p-cresol | 0.2 |
| Charge 2 | |
| Butyl acrylate | 179.2 |
| Charge 3 | |
| 2,6-di-tert-butyl p-cresol | 0.2 |
| Charge 4 | |
| Dibutyl maleate | 114.0 |

Charge 1 was added to a suitable flask equipped with an overhead stirrer, thermocouple, condenser, and $N_2$ inlet. The charge was placed under a $N_2$ blanket. Beginning at a temperature of 22° C., Charge 2 was added to the flask over a period of 1 hour. A mild exotherm was observed during the addition. At the completion of the charge, the temperature of the reaction mixture was 28° C. The reaction mixture was heated to a temperature of 35° C. with an external heat source and held at this temperature for 3 hours. Inspection of the infrared spectrum of the reaction mixture indicated the presence of butyl acrylate (peaks at 1621, 1635 cm$^{-1}$). The reaction mixture was then heated to 50° C. and held for 3.25 hours, then heated to 70° C. and held for 4.25 hours, then to 80° C. and held for 1.25 hours. Inspection of the infrared spectrum of the reaction mixture indicated consumption of the acrylate. The reaction mixture was cooled; at a temperature of 38° C., Charge 3 was added to the reaction mixture. At a temperature of 35° C., addition of Charge 4 was begun over a period of 50 minutes. At the end of the addition the temperature of the reaction mixture was 38° C. The temperature of the reaction mixture was increased to 50° C. and held for 2.9 hours. Inspection of the infrared spectrum of the reaction mixture indicated the reaction was complete (absence of peak at 1646 cm$^{-1}$). The resulting material was found to have measured solids content (110° C., 1 hr) of 95.9 percent, a viscosity of A-B on the Gardner-Holt scale, a density of 8.14 lb/gal, a total amine content of 4.328 meq/g, a residual primary amine content of 0.445 meq/g, a secondary amine content of 3.691 meq/g, a tertiary amine content of 0.192 meq/g, and a $M_w$ of 458 and a $M_n$ of 421 as determined by gel permeation chromatography vs. a polystyrene standard.

Example L

An acrylate modified amine curative was prepared from the following ingredients:

| Ingredient | Wt in g |
| --- | --- |
| Charge 1 | |
| JEFFAMINE D2000[1] | 3490.5 |
| 2,6-di-tert-butyl p-cresol | 7.77 |
| Dibutyltin dilaurate | 19.4 |
| Charge 2 | |
| Butyl acrylate | 437.9 |

[1]Difunctional polyoxyalkyleneamine of approximately 2000 molecular weight, available from Huntsman Corporation.

Charge 1 was added to a suitable flask equipped with an overhead stirrer, thermocouple, condenser, and air inlet. The charge was placed under an air blanket. Beginning at a temperature of 22° C., Charge 2 was added to the flask over 18 minutes. No exotherm was observed. The reaction temperature was increased to 70° C. and held for 2.9 hours. Inspection of the infrared spectrum of the reaction mixture indicated the presence of unreacted acrylate (peaks at 1621, 1635 cm$^{-1}$). The temperature of the reaction mixture was raised to 90° C. and held for 8.8 hours. At this point, the infrared spectrum of the mixture indicated that the acrylate had been consumed. The resulting material was found to have measured solids content (110° C., 1 hr) of 95.4 percent, a viscosity of G– on the Gardner-Holt scale, a total amine content of 0.884 meq/g, a primary amine content of 0.155 meq/g, a secondary amine content of 0.702 meq/g, a tertiary amine content of 0.022 meq/g, a $M_w$ of 2180, a $M_n$ of 769, and $M_z$ of 2993 as determined by gel permeation chromatography vs. a polystyrene standard.

Example M

An aspartate modified amine curative with a secondary non-aspartate amino group was prepared from the following ingredients:

| Ingredient | Wt in g |
| --- | --- |
| Charge 1 | |
| Dipropylene triamine | 2292.5 |
| 2,6-di-tert-butyl p-cresol | 10.5 |
| Charge 2 | |
| Diethyl maleate | 5779.2 |

Charge 1 was added to a suitable flask equipped with an overhead stirrer, thermocouple, condenser, and $N_2$ inlet. The charge was placed under a $N_2$ blanket. Beginning at a temperature of 22° C., Charge 2 was added to the flask over a period of 6 hours. An exotherm was observed during the addition. A maximum temperature of 49° C. was observed during the addition of this charge. At temperature of 48° C. (3.75 hours into the charge) cooling was applied to the reactor in the form of a stream of air. At a temperature of 49° C. (4.5 hours into the charge) an ice bath was applied to the reactor. At the completion of the charge, the temperature of the reaction mixture was 41° C. The reaction mixture was heated to a temperature of 50° C. with an external heat source and held at this temperature for 3.6 hours. Inspection of the infrared spectrum of the reaction mixture indicated consumption of diethyl maleate (disappearance of peak at 1646 cm$^{-1}$). The resulting material was found to have measured solids content (110° C., 1 hr) of 97.4 percent, a viscosity of E on the Gardner-Holt scale, a density of 8.93 lb/gal, a total amine content of 6.303 meq/g, a residual primary amine content of 0.298 meq/g, a secondary amine content of 6.011 meq/g, a tertiary amine content of 0.044 meq/g, and a $M_w$ of 248 and a $M_n$ of 178 as determined by gel permeation chromatography vs. a polystyrene standard.

Example 1

An isocyanate functional "A" side formula was prepared from the following ingredients:

| Ingredients | % by wt |
| --- | --- |
| TERATHANE 650[2] | 21.0 |
| 1,2-butanediol | 1.2 |
| Neopenyl glycol | 1.2 |
| Isophorone diisocyanate | 27.1 |
| DESMODUR N 3400[3] | 49.4 |

[2]Polytetramethylene ether glycol, available from Invista.
[3]Aliphatic polyisocyanate resin based on hexamethylene diisocyanate, available from Bayer Corporation.

TERATHANE 650, neopenyl glycol, 1,2-butanediol, and a catalytic amount of dibutyltin dilaurate (0.013% by wt of the three glycols) were charged to a suitable reactor under nitrogen. Isophorone diisocyanate was added to the reactor over 105 minutes at a temperature range of 36-37° C. Over a period of 50 minutes the temperature of the mixture was increased to 52° C. Over a period of 60 minutes the temperature increased to a maximum of 125° C. After another 60 minutes the resulting prepolymer equivalent weight was found to be within specification. The resulting prepolymer was cooled to 71° C. and poured into 87.9% of the DESMODUR N3400 and stirred for 30 minutes. The remaining DESMODUR N 3400 was added to adjust to a final isocyanate equivalent weight of 264.9.

Examples 2-4

Pigment grinds were prepared according to the formulas in Table 1

TABLE 1

| | Wt in g | | |
| --- | --- | --- | --- |
| Ingredient | Example 2 | Example 3 | Example 4 |
| Acrylate/asparate amine curative of Example A | 367.0 | 444.0 | |
| JEFFAMINE D2000/butyl acrylate adduct of Example L | | 168.0 | |
| JEFFAMINE T3000[4] | | | 436.9 |
| CLEARLINK 1000[5] | 406.2 | | |
| JEFFLINK 754[6] | | | 339.1 |
| DESMOPHEN NH 1420[7] | | 120.0 | |
| TINUVIN 292[8] | 13.5 | 12.0 | 13.0 |

TABLE 1-continued

| | Wt in g | | |
| --- | --- | --- | --- |
| Ingredient | Example 2 | Example 3 | Example 4 |
| VULCAN XC72[9] | 16.2 | 14.4 | 15.7 |
| BENTONE 34[10] | 47.0 | 41.6 | 45.3 |

[4]Polyoxyalkylenetriamine of approximately 3000 MW, available from Huntsman Corporation.
[5]Secondary cycloaliphatic diamine, available from Dorf Ketal Chemicals, LLC.
[6]Aliphatic secondary amine, available from Huntsman Corporation.
[7]Asparatic ester amine, available from Bayer Corporation.
[8]Hindered amine light stabilizer, available from Ciba Speciality Chemicals Corporation.
[9]Carbon black pigment, available from Cabot Corporation.
[10]Organoclay rheology additive, available from Elementis Specialities, Inc.

In each example, the ingredients were combined and charged to a Model M250 bead mill (Eiger Machinery, Inc.) with 188 mL Zirconox 1.0 mm beads (Jyoti Ceramic Industries Pvt. Ltd.) and ground at a mill speed of 3500 rpm. The grinds were judged to be complete when the particle size was found to be 7.5 Hegman upon drawdown on a fineness of grind gauge.

Examples 5-8

The following "B side" formulations were produced as indicated Table 2:

TABLE 2

| | Wt in g | | | |
| --- | --- | --- | --- | --- |
| Ingredients | Example 5 | Example 6 | Example 7 | Example 8 |
| Pigment grind composition of Example 2 | 62.77 | 62.77 | | |
| Pigment grind composition of Example 3 | | | 100.01 | |
| Pigment grind composition of Example 4 | | | | 156.41 |
| Oligomeric aspartate/acrylate amine curative of Example I | | | 22.5 | |
| Acrylate/aspartate amine curative of Example B | | | | 72.19 |
| JEFFAMINE D2000 | 26.48 | | | |
| JEFFAMINE T3000 | | | | 9.60 |
| JEFFAMINE D2000/butyl acrylate adduct of Example L | | 26.48 | 1.50 | |
| Dipropylene diamine/diethyl maleate adduct of Example M | 10 | 10 | 9.87 | |
| JEFFLINK 754 | | | 15.0 | |
| Dibutyltin dilaurate | 0.75 | 0.75 | 1.13 | 1.8 |

The B side formulations of Table 2 above and the A side formulation of Example 1 were charged to separate canisters and heated to 140° F. in an oven for 4-6 hrs prior to spraying. Polyurea coating compositions were produced by mixing a 1:1 volume ratio of the A-side components to each the B-side components in a static mix tube applicator device available from Cammda Corporation. The coating compositions were applied to cold rolled steel panels coated with an electrodeposition primer and an epoxy acid clearcoat (APR 26241 available from ACT Laboratories, Inc.). Tack times for the coatings were determined by periodically touching the panel with a gloved hand as previously described and were judged to be tack free when the glove no longer stuck to the coatings.

Hardness values were determined by charging the A and B side components into a double-barreled syringe equipped with a static mix tube and a "Pneumatic applicator" (PC Cox Limited) and injecting the components at a 1:1 ratio using a into a mold to form a round "puck" of approximately 6 cm in diameter and 0.2 cm in thickness. The hardness of the polyurea coating puck at ambient temperature was measured on the Shore D scale with a Model 212 Pencil Style Digital Durometer (Pacific Transducer Corp.) 1 day after application. The pucks were then placed in a 140° F. "hot room" for 1 day and the Shore D hardness of the coating measured with the puck in the hot room to prevent cooling. The pucks were removed from the hot room to ambient temperature and the hardness measured again at ambient temperature after 1 day.

The ratio of equivalents of isocyanate to amine was calculated as being 1.059 for the polyurea formulation comprising the B side component of Example 5, 1.072 for the polyurea formulation comprising the B side component of Example 6, 1.092 for the polyurea formulation comprising the B side component of Example 7, and 1.082 for the polyurea formulation comprising the B side component of Example 8.

The following properties of the polyurea coatings were determined:

TABLE 3

|  | Ex 5 | Ex 6 | Ex. 7 | Ex. 8 |
|---|---|---|---|---|
| Tack free time (sec) | 28 | 31 | 44 | 15 |
| Hardness (Shore D) 1 day after cure, ambient temperature | 72 | 68 | 64 | 66 |
| Hardness (Shore D) after 1 day at 140° F. | 35 | 35 | 28 | 34 |
| Hardness (Shore D) 1 day at ambient temperature after 140° F. | 68 | 66 | 70 | 66 |

Whereas particular embodiments of this invention have been described above for purposes of illustration, it will be evident to those skilled in the art that numerous variations of the details of the present invention may be made without departing from the invention as defined in the appended claims.

Therefore we claim:

1. A polyurea comprising the reaction product of
   i) a (meth)acrylate/aspartate amine curative comprising the reaction product of
      a) a polyamine,
      b) a dialkyl maleate and/or dialkyl fumarate, and
      c) a (meth)acrylate, and
   ii) an isocyanate.

2. The polyurea of claim 1, wherein the isocyanate comprises a prepolymer.

3. The polyurea of claim 2, wherein the isocyanate prepolymer comprises isocyanate and polyether polyol.

4. The polyurea of claim 2, wherein the isocyanate prepolymer comprises isocyanate and polyether amine.

5. The polyurea of claim 1, wherein the reaction product of the curative and the isocyanate does not comprise an unsaturated oligoester prepared by (trans)esterification of an dialkyl maleate or dialkyl fumarate with a diol, triol, or tetraol or an unsaturated oligoester prepared by direct esterification of maleic or fumaric acid with a diol, triol, or tetraol.

6. The polyurea of claim 1, further comprising one or more additional amines.

7. The polyurea of claim 6, wherein the additional amines comprises
   a. diamine of structure

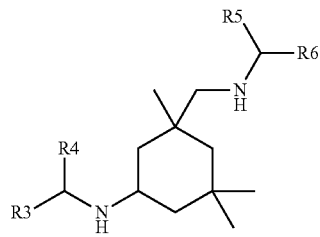

wherein R3-R6 are independently C1-C10 alkyl;
   b. diamine of structure

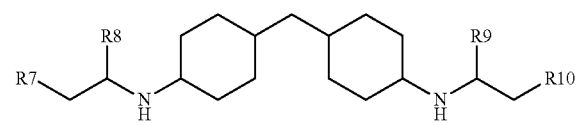

wherein R7-R10 are independently C1-C10 alkyl;
   c. a polyoxyalkylenediamine and/or a polyoxyalkylenetriamine comprising primary and/or secondary amino groups;
   d. an aspartic ester functional diamine with no other functionality that is reactive with isocyanate; and/or
   e. a reaction product of dipropylene triamine with diethyl maleate and/or dibutyl maleate.

8. A coating composition comprising the polyurea of claim 1.

9. A coating composition comprising the polyurea of claim 5.

10. A substrate coated at least in part with the coating composition of claim 8.

11. The substrate of claim 10, wherein the substrate comprises at least a portion of a vehicle.

12. The substrate of claim 11, wherein the vehicle is a truck and the portion of the vehicle comprises a truck bed.

13. The substrate of claim 10, wherein the substrate comprises at least a portion of a building structure.

14. The polyurea of claim 1, wherein the ratio of equivalents of isocyanate groups to equivalents of amine groups is greater than one and the isocyanate and amine can be applied to a substrate at a volume mixing ratio of 1:1.

15. The polyurea of claim 6, wherein the additional amine comprises

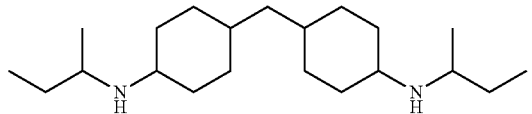

and the polyurea has a Shore D hardness of at least 30 when measured at 140° F.

16. The substrate of claim 12, wherein the truck bed has been coated at least in part with a clearcoat having low surface functionality after cure prior to application of the polyurea.

17. A coating composition comprising the polyurea of claim 6.

18. The coating of claim 17, wherein the reaction index of amine to isocyanate is 1.01 to 1.5:1, and the index is calculated based upon the total of the equivalents of the amine curative and the one or more additional amines.

* * * * *